(12) United States Patent
Hilgers et al.

(10) Patent No.: US 12,114,809 B2
(45) Date of Patent: Oct. 15, 2024

(54) FOOD PROCESSOR AND METHOD FOR TAKING A FOOD SAMPLE

(71) Applicant: Vorwerk & Co. Interholding GmbH, Wuppertal (DE)

(72) Inventors: Stefan Hilgers, Essen (DE); Sarah Dittmann, Zürich (CH)

(73) Assignee: Vorwerk & Co. Interholding GmbH (DE)

( * ) Notice: Subject to any disclaimer, the term of this patent is extended or adjusted under 35 U.S.C. 154(b) by 110 days.

(21) Appl. No.: 17/481,769

(22) Filed: Sep. 22, 2021

(65) Prior Publication Data

US 2022/0087479 A1    Mar. 24, 2022

(30) Foreign Application Priority Data

Sep. 24, 2020    (EP) .................................. 20198065

(51) Int. Cl.
*A47J 43/07*    (2006.01)
*A23L 5/10*    (2016.01)
(Continued)

(52) U.S. Cl.
CPC ............. *A47J 43/0772* (2013.01); *A23L 5/15* (2016.08); *A47J 27/004* (2013.01); *A47J 36/32* (2013.01);
(Continued)

(58) Field of Classification Search
CPC ........ A47J 43/0772; A47J 27/00; A47J 36/32; A47J 43/046; A23V 2002/00
(Continued)

(56) References Cited

U.S. PATENT DOCUMENTS 2,056,941 A * 10/1936 Krichton ............... A47J 27/004
                                                     219/478
5,329,069 A *  7/1994 Amsel .................. A47J 43/046
                                                     177/245
(Continued)

FOREIGN PATENT DOCUMENTS

CN      101594810 A    12/2009
EP        0024992 A1    3/1981
(Continued)

OTHER PUBLICATIONS

WO2014026866 (Year: 2023).*
(Continued)

*Primary Examiner* — Nathaniel E Wiehe
*Assistant Examiner* — Frederick F Calvetti
(74) *Attorney, Agent, or Firm* — Barnes & Thornburg LLP

(57) ABSTRACT

The present disclosure relates to a food processor along with a corresponding method for performing a food preparation process by heating, chopping and/or mixing a food in a food preparation vessel. The food processor comprises a control device configured such that the control device ensures, based on one or more cooking parameters, that in a cooking mode a food is heated, chopped and/or mixed in the food preparation vessel. A sampling mode for taking a food sample is provided and the control device is configured such that at least one of the cooking parameters is modified compared to the cooking mode for a modified continuation of the food preparation process when the sampling mode is activated. A particularly reproducible cooking result can be achieved in this way despite taking a food sample.

19 Claims, 1 Drawing Sheet

(51) Int. Cl.
*A47J 27/00* (2006.01)
*A47J 36/32* (2006.01)
*A47J 43/046* (2006.01)

(52) U.S. Cl.
CPC ......... *A47J 43/046* (2013.01); *A23V 2002/00* (2013.01)

(58) Field of Classification Search
USPC .......................................................... 99/486
See application file for complete search history.

(56) References Cited

U.S. PATENT DOCUMENTS

| | | | | |
|---|---|---|---|---|
| 6,213,007 | B1* | 4/2001 | Lande | A23G 9/12 |
| | | | | 366/601 |
| 6,276,264 | B1* | 8/2001 | Dumm | A01J 11/00 |
| | | | | 99/452 |
| 6,397,735 | B1* | 6/2002 | Wong | A47J 43/046 |
| | | | | 366/601 |
| 11,311,142 | B2* | 4/2022 | Mosebach | A47J 27/004 |
| 2004/0042337 | A1* | 3/2004 | Yiu | A47J 43/0777 |
| | | | | 366/205 |
| 2009/0258331 | A1* | 10/2009 | Do | G09B 21/003 |
| | | | | 434/127 |
| 2014/0104974 | A1* | 4/2014 | Choi | A47J 43/0722 |
| | | | | 366/142 |
| 2016/0270592 | A1* | 9/2016 | Sauerwald | A47J 43/04 |
| 2017/0150841 | A1* | 6/2017 | Johncock | G05B 15/02 |
| 2018/0038737 | A1* | 2/2018 | Hedlund | G01J 5/0205 |

FOREIGN PATENT DOCUMENTS

| | | | |
|---|---|---|---|
| EP | 1239703 | * | 9/2002 |
| EP | 2540199 | A1 | 1/2013 |
| GB | 2285211 | * | 7/1995 |
| GB | 2441493 | * | 12/2008 |
| WO | 2005051150 | A1 | 6/2005 |
| WO | 2019211213 | A1 | 11/2019 |

OTHER PUBLICATIONS

WO2017/211963 (Year: 2023).*
WO2021/119730 (Year: 2023).*
WO2005/051150 (Year: 2023).*
WO2019/211213 (Year: 2023).*
EP2540199 (Year: 2023).*
EP1273252 (Year: 2023).*
GB2550630 (Year: 2023).*
EP0812560 (Year: 2023).*
GB2441493 (Year: 2024).*
European Patent Office Search Report for Application No. 20198065.3-1004, dated Feb. 22, 2021, 2 pages.

* cited by examiner

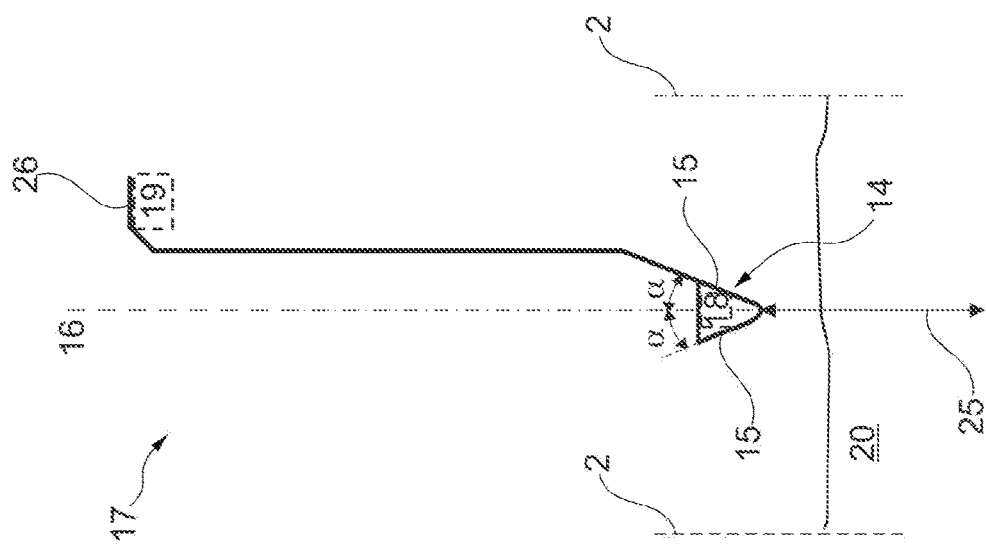
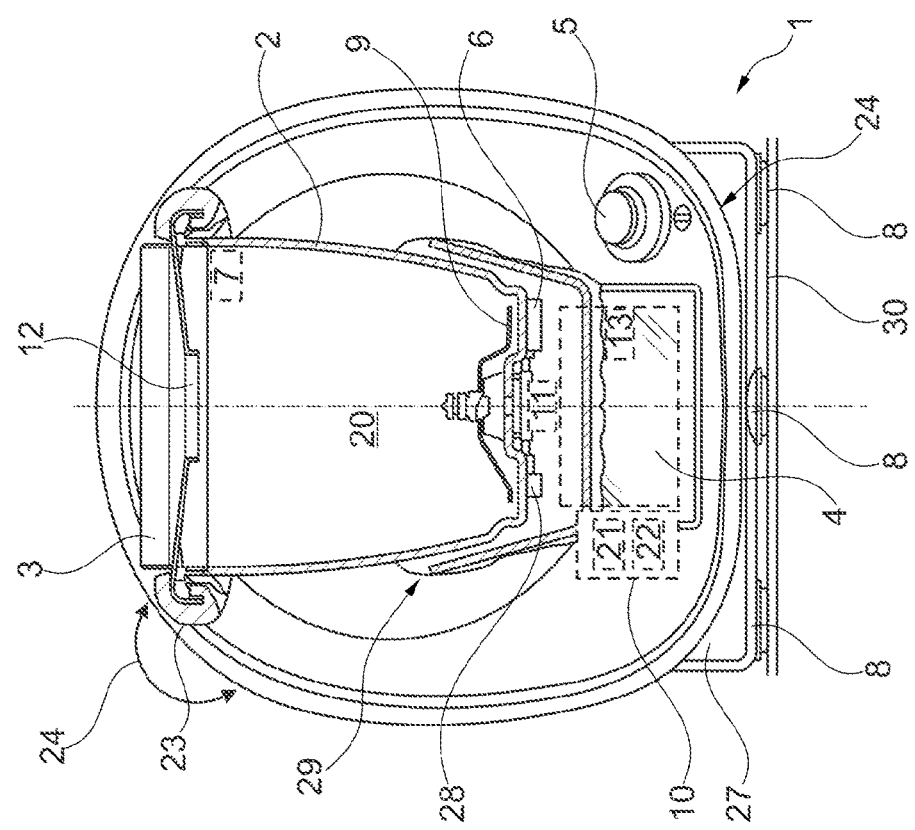

FOOD PROCESSOR AND METHOD FOR TAKING A FOOD SAMPLE

CROSS REFERENCE TO RELATED APPLICATIONS

This application claims priority to and the benefit of European Patent Application Number 20198065.3, filed 24 Sep. 2020, the disclosure of which is now expressly incorporated herein by reference.

FIELD OF THE DISCLOSURE

The present disclosure relates to a food processor for performing a food preparation process by heating, chopping and/or mixing a food in a food preparation vessel. The food processor comprises a control device configured such that the control device ensures, based on one or more cooking parameters, that a food is heated, chopped and/or mixed in the food preparation vessel in a cooking mode. The present disclosure further relates to a corresponding method.

BACKGROUND

Especially with high-quality food processors, the user expects that he or she will achieve a reproducible cooking result of high quality by means of the food processor. Furthermore, as with other kitchen appliances, safety of the user is generally expected. For reasons of user safety, for example, seasoning is not provided during a food preparation process in high-quality food processors.

Some cooking blenders with lids, where the user successively fills ingredients into the container from above during operation and is able to remove the lid for this purpose during operation, may pose safety risks. Therefore, some stand mixers have a safety interlock that automatically stops operation when the lid is removed from the container. On other stand mixer devices, operation pauses for a short time when the lid is removed. In yet other devices, the lid can be removed during operation to add ingredients to the container from above for blending.

The foregoing features known in the prior art may be combined individually or in any combination with any of the aspects and configurations of the disclosed design(s) described below.

It is the task of the present disclosure to provide a further developed food processor together with a further developed method.

SUMMARY

A food processor for performing a food preparation process by heating, chopping and/or mixing a food in a food preparation vessel is disclosed herein. The food processor comprises a control device configured such that the control device ensures, based on one or more cooking parameters, that in a cooking mode a food is heated, chopped and/or mixed in the food preparation vessel. A sampling mode is provided for taking a food sample and the control device is configured such that at least one of the cooking parameters is modified compared to the cooking mode for a modified continuation of the food preparation process when the sampling mode is activated.

The disclosed design(s) and method(s) enable a user to achieve a cooking result with an improved reproducibility in a safe and convenient manner.

As explained at the beginning, achieving a reproducible cooking result is of particular importance for high-quality food processors. It has been recognized that a cooking result can be achieved with an improved reproducibility by taking a food sample. The food sample allows tasting and readjustment, e.g. by adding spices, before an end of an ongoing food preparation process or recipe step thereof is reached. For example, if a food includes too little salt, this deficiency cannot be corrected by a subsequent application of salt after the end of a heating and mixing process to achieve the same cooking result. However, if the lack of salt is detected and corrected during the cooking and mixing process by taking a sample of the food, the cooking result is almost identical. At the same time, an individualization of this cooking result is maintained, i.e., an adaptation to the user's preferences or peculiarities, e.g., to his or her individual perception of the salt content in a food.

To take a food sample, a sampling instrument is immersed in the food and removed from the container. Unlike a stand mixer, where ingredients are normally dropped into the container from above for successive mixing, immersion of a sampling instrument, for example, creates the risk of collision with the tool for chopping. In addition, depending on the food preparation process, the user would be exposed to hot vapors that in some cases could escape under pressure toward the user. Interrupting the operation would eliminate these risks, but reduce the quality of the cooking result. For example, provided mixing and cooking times designed to achieve a reproducible cooking result would no longer be met.

The present disclosure is based on the following finding. It has been recognized that safely taking a food sample is not only possible by stopping or interrupting the food preparation process, but that a modified continuation of the food preparation process also enables safely taking a food sample. Based on this, it was also determined that the modified continuation of the food preparation process has less of a negative effect on the cooking result than expected. Rather, the possibility of taking a food sample in sampling mode according to the present disclosure, as explained above, results in an improvement of the cooking result, which overall overcompensates the negative effects mentioned above (from the not unchanged continuation of the food preparation process). In other words, a cooking result with an overall improved reproducibility is achievable in a safe and convenient manner for the user.

In the following, exemplary embodiments are explained in more detail with reference to figures. Features of the exemplary embodiments may be combined individually or in a plurality with the claimed subject matter, unless otherwise indicated. The claimed scopes of protection are not limited to the exemplary embodiments.

BRIEF DESCRIPTIONS OF THE DRAWINGS

The figures show:

FIG. 1: Schematic representation of a food processor with a partial section through the food preparation vessel; and FIG. 2: Schematic representation of the taking of a food sample.

DETAILED DESCRIPTION

FIG. 1 shows a food processor 1 for performing a food preparation process in a food preparation vessel 2. A heating element 6 may be provided for heating the food 20, in particular in the bottom region of the food preparation vessel 2. A rotatable tool 9 may be used for chopping and/or mixing the food 20, which is coupled to a drive 11 via a shaft not shown, in particular through an opening in the bottom of the food preparation vessel 2. A housing 27 of the food processor encloses the drive 11 and provides a receptacle 29 for the food preparation vessel 2. The food processor 1 has a control device 10 for controlling the functional component such as heating element 6 or tool 9 or drive 11. Measurement sensors for detecting an actual status such as a temperature sensor 28 may be provided. The control device 10 comprises a processor 21 and a memory 22.

A lid 3 may be provided for closing the food preparation vessel 2. The lid 3 may include a lid opening 12 for dispensing ingredients into the food preparation vessel 2 predominantly covered by the lid 3. A locking device 23 may be provided to lock the lid 3 in the closed state, for example with rollers as shown in FIG. 1. A pivoting movement 24 can be used to change between a locked and unlocked state, preferably by means of a motor of the locking device 23 which is not shown. The locked or unlocked state can be detected, for example, by a lid locking sensor which is not shown.

The user can receive information and instructions from the control device 10 and provide input to the control device 10 via a user interface 24, which in particular comprises a touch screen display 4 or a button 5. Preferably, the control device 10 has access to digital recipes having a plurality of recipe steps that can be implemented by means of the user interface 24 by the user and the food processor to prepare a food 20.

The control device 10 ensures, based on one or more cooking parameters, that in a cooking mode a food 20 in the food preparation vessel 2 is heated, chopped and/or mixed in a desired manner. A sampling mode is provided for taking a food sample, wherein at least one of the cooking parameters is modified compared to the cooking mode for a modified continuation of the food preparation process when the sampling mode is activated.

The activation of the sampling mode can be initiated by a recipe step or a detection of the lifting of the lid 3. For this purpose, for example, weight sensors 8 in the standing feet of the food processor 1, through which the housing 27 stands on a base 30, or a contact sensor 7 on the food preparation vessel 2 or lid 3 can be used. Alternatively or additionally, activation is possible by means of a button 5 or by pressing a graphic symbol 13 on the touchscreen display 4.

An enabling unit may be provided to enable the initiated activation taking into account the current recipe step, temperature, rotation number or torque. For example, it makes little sense to take a food sample while sugar is being processed into powdered sugar at 10,000 rpm.

In particular after the activation has been enabled, the control device changes into the sampling mode. This has the consequence that at least one cooking parameter, which was used in cooking mode above a defined desired value according to the sampling mode to control a functional component, is reduced to the lower desired value according to the sampling mode, i.e. it is modified. For example, the torque, the rotation number or the temperature are reduced to corresponding desired values according to the sampling mode.

In one embodiment, it is provided that after the modification of the at least one cooking parameter in the sampling mode, removal of the lid 3 is only permitted when a corresponding measured variable, e.g. actual temperature or rotation number of the tool in the food preparation vessel, falls below a predefined threshold value. For example, only then is the locking device 23 activated to unlock the lid 3.

In one embodiment, the lifting of the lid 3 is detected. If the lid 3 has not been lifted off after a defined period of time following activation of the sampling mode, an automatic change back to the cooking mode can take place.

In the sampling mode, the user can take a food sample from the food and use it, for example, to taste the food.

In one embodiment, the closing of the lid 3 is detected and the control device 10 is configured such that a change from the sampling mode back to the cooking mode takes place only when the food preparation vessel 2 is closed and/or locked by the lid 3.

By deactivating the sampling mode and/or when the lid 3 is in place or locked, the previous status before activation of the sampling mode is resumed in order to continue the food preparation process. In one embodiment, it can be provided that depending on the time duration of the sampling mode and/or depending on the recipe step, the control device automatically corrects at least one cooking parameter according to the cooking mode. Correcting means that if, due to the sampling mode, an undesirable impairment of the food preparation process is to be feared or is present due to the modified continuation during the sampling mode, this impairment is compensated for as far as possible during continuation of the food preparation process in the cooking mode after the sampling mode by correcting at least one cooking parameter.

FIG. 2 schematically illustrates the process of taking a food sample by an immersion movement 25 from a food preparation vessel 2, which is only partially indicated by dashed lines, with a food 20 in it. In principle, a conventional spoon can be used for taking the sample. In FIG. 2, an elongated, ladle-like sampling instrument 17 provided for taking a food sample is shown with a handle portion 26 for holding by a user and a receiving portion 14 for receiving the food sample. The sampling instrument 17 is preferably at least as long as the food preparation vessel 2 is deep. The v-shaped receiving portion 14 has a curved or rectilinear outer wall 15 with an angle α between 30° to 60° to the longitudinal extension direction 16. In particular, a sensor 18 for detecting a status information of the food 20 or the food sample and/or a communication interface 19 is arranged on the sampling instrument 17.

In a food processor, a heating element is preferably used for heating, which is arranged or integrated in particular at the bottom of the food preparation vessel. Preferably, a rotatable tool serves for chopping and/or mixing, which is arranged in particular in the bottom area of the food preparation vessel. Preferably, a drive for rotating the tool is arranged in a housing of the food processor. In particular, the drive is connected to the tool via a shaft that extends in a sealed manner through an opening in the bottom of the food preparation vessel. Preferably, the tool has a blade.

A control device comprises a memory and a processor. The memory basically has a computer program code, i.e. instructions that can be stored on the memory. The processor, the memory, and the computer program code are configured such that the instructions of the computer program code are executed by the control device. In particular, the control device is connected to a heating element and/or a drive for a rotatable tool for control.

A cooking parameter is a parameter stored in the control device for controlling a functional component for the food preparation process, such as the heating element or the drive. In one embodiment, the functional components may include a pressure adjusting unit, in particular a controllable pressure valve. Concerning the heating element, a cooking parameter may preferably specify the desired temperature.

Concerning the drive, a cooking parameter may specify the desired rotation number or the desired torque. Concerning the pressure adjusting unit, a cooking parameter may specify the desired pressure in the food preparation vessel. Preferably, a temperature sensor, a rotation number sensor, a torque sensor and/or a pressure sensor are provided, which are in particular connected to the control for the purpose of signal transmission. In one embodiment, the drive and the control are configured such that a rotatable tool for chopping and/or mixing can be rotated in two directions of rotation, i.e., clockwise rotation mode and counterclockwise rotation mode. In particular, a cooking parameter sets a desired direction of rotation of the tool for chopping and/or mixing.

Cooking mode means an operating status in which all cooking parameters are set as intended by the current food preparation process, i.e. without considering the taking of a food sample.

Sampling mode means an operating status that is different from the cooking mode. The sampling mode and the cooking mode are implemented in the control device. At least one cooking parameter of the at least one cooking parameter has a value according to the cooking mode and a value according to the sampling mode for the current food preparation process. For at least one cooking parameter, the value according to the cooking mode and the value according to the sampling mode are different. A sampling mode for taking a food sample is in particular a sampling mode for taking a food sample with an open lid. Preferably, for taking a food sample, the lid is lifted off the food preparation vessel, preferably by the user. In one embodiment, an automatic lifting device is provided that lifts the lid off the food preparation vessel for taking a food sample. Automatic lifting occurs without the force of the user. Preferably, an electric motor is provided to implement the automatic lifting. In particular, during automatic lifting, the lid is tilted by the lifting device so that the user can take a food sample from the food preparation vessel opened in this way.

The feature according to which "at least one of the cooking parameters is modified compared to the cooking mode for a modified continuation of the food preparation process when the sampling mode is activated" means that the control device modifies at least one cooking parameter of the at least one cooking parameter. Further, the term "one of the following cooking parameters" has the meaning "at least one of the following cooking parameters". The at least one cooking parameter according to the cooking mode is modified so that this cooking parameter is then defined according to the sampling mode. The modified value of the cooking parameter according to the sampling mode compared to the cooking mode results in a modified continuation of the food preparation process, i.e., the food preparation process is not terminated, interrupted or continued unchanged. For example, the food preparation process is instead continued with a lower desired temperature, a different desired direction of rotation, a lower desired rotation number, a lower desired torque and/or a lower desired pressure. Activation of the sampling mode occurs or is initiated by an activation signal to the control. The activation signal can be triggered by pressing a button, a graphic symbol on a touch screen display, by an instruction of a recipe step of a digital recipe and/or by a sensor signal.

In one configuration, a cooking parameter of the at least one cooking parameter, which is modified in the sampling mode compared to the cooking mode for the modified continuation of the food preparation process, is a desired direction of rotation, in particular of the rotatable tool for chopping and/or mixing. In this way, mixing can be continued particularly effectively with a lower rotation number. Preferably, the tool has a blade and a blunt edge, wherein the blade points in one direction of rotation (e.g. clockwise rotation) and the blunt edge points in the other direction of rotation (e.g. counterclockwise rotation). The user can thus achieve an improved reproducibility of the cooking result in a particularly safe and convenient manner.

In an alternative or supplementary configuration, a cooking parameter of the at least one cooking parameter, which is modified in the sampling mode compared to the cooking mode for the modified continuation of the food preparation process, is a desired torque for the chopping and/or mixing, in particular of the rotatable tool. The user can thus achieve an improved reproducibility of the cooking result in a particularly safe and convenient manner. It has been recognized that user safety can be increased particularly effectively by modifying the desired torque when the food preparation process is continued in a modified manner in the sampling mode. The control device can preferably limit the power of the electric drive in sampling mode, for example to a maximum value. In a way, the chopping and/or mixing tool then lacks the power to cause serious damage by accidentally colliding with the rotating tool.

The one cooking parameter of the at least one cooking parameter that is modified in the sampling mode compared to the cooking mode for the modified continuation of the food preparation process is a cooking parameter of the at least one cooking parameter that is modified compared to the cooking mode for a modified continuation of the food preparation process. In one embodiment, depending on a food preparation process, a value according to the cooking mode and a value according to the sampling mode, respectively, are determined for the one or more cooking parameters of the at least one cooking parameter, i.e., stored, for example, in the memory of the control device. During modification, the cooking parameter is assigned the value according to the sampling mode instead of the value according to the cooking mode.

In one configuration, the desired torque—i.e. one of the cooking parameters of the at least one cooking parameter that is modified in comparison to the cooking mode for a modified continuation of the food preparation process—is at least 0.1 N*m and/or at most 0.4 N*m in the sampling mode. The user can thus achieve an improved reproducibility of the cooking result in a particularly safe and convenient manner. This configuration relates to the case when the desired torque according to the cooking mode for the food preparation process is greater than 0.4 N*m. In other words, this configuration relates to the case where during the ongoing food preparation process the desired torque (as the one cooking parameter of the at least one cooking parameter) is modified from a value greater than 0.4 N*m according to the cooking mode to a value less than 0.4 N*m, but in particular greater than 0.1 N*m, according to the sampling mode. The modification occurs when the sampling mode is activated in this ongoing food preparation process. In one embodiment, the above-mentioned value of 0.4 N*m of the previously described configuration is replaced by the value of 1 N*m, 2 N*m or 3 N*m in order to improve the quality of the cooking result for, in particular, those foods that present an additional barrier to the rotating tool, such as dough.

In one embodiment, the control device is configured such that the control device for controlling and/or closed-loop controlling the desired torque keeps a rotation number of the rotatable tool constant by controlling the current for the electric drive, but limits the maximum possible current, preferably to at most 1 A, particularly preferably at most 0.8 A. In one embodiment, the desired torque is at least 0.1 N*m, preferably at least 0.2 N*m, particularly preferably at least 0.3 N*m, in order to be able to continue the food preparation process with a sufficiently high force and thus to counteract a deterioration of the cooking result. This can ensure, for example, that common ingredients of a food are stirred with the required force by the rotating tool.

Generally, controlling by the control device as defined in the present disclosure may include a closed-loop control or control operation.

The control device can control a functional component by means of a cooking parameter in order to realize the torque, the rotation number or the temperature for the food preparation process according to the cooking parameter. In one embodiment, the same applies to the pressure or desired pressure.

In an alternative or supplementary configuration, a cooking parameter of the at least one cooking parameter, which is modified in the sampling mode compared to the cooking mode for the modified continuation of the food preparation process, is a desired rotation number for the chopping and/or mixing, in particular of the rotatable tool. The user can thus achieve an improved reproducibility of the cooking result in a particularly safe and convenient manner. User safety can be increased particularly effectively by modifying the desired rotation number if the food preparation process is continued in a modified form in the sampling mode.

In one configuration, the desired rotation number—i.e. one of the cooking parameters of the at least one cooking parameter that is modified in comparison to the cooking mode for a modified continuation of the food preparation process—is at least 80 rpm and/or at most 120 rpm or at most 220 rpm in the sampling mode. The user can thus achieve an improved reproducibility of the cooking result in a particularly safe and convenient manner. This configuration relates to the case when the desired rotation number according to the cooking mode for the food preparation process is greater than 120 rpm or 220 rpm, i.e., for the current food preparation process before modifying the desired rotation number from the value according to the cooking mode to the value according to the sampling mode.

In one embodiment, a value range for the desired rotation number according to the sampling mode is 80 to 120 rpm or 180 to 220 rpm, in particular depending on the food currently being prepared. A deterioration of the cooking result can thus be counteracted in an improved manner by the modified continuation of the food preparation process in sampling mode.

In an alternative or supplementary configuration, a cooking parameter of the at least one cooking parameter, which is modified in the sampling mode compared to the cooking mode for the modified continuation of the food preparation process, is a desired temperature for the heating, in particular of the heating element. The user can thus achieve an improved reproducibility of the cooking result in a particularly safe and convenient manner. The user safety can be increased by modifying the desired temperature when the food preparation process is continued in the sampling mode.

In one configuration, the desired temperature—i.e. one of the cooking parameters of the at least one cooking parameter that is modified in comparison to the cooking mode for a modified continuation of the food preparation process—is at least 30° C. and/or at most 80° C. in the sampling mode. The user can thus achieve an improved reproducibility of the cooking result in a particularly safe and convenient manner.

Since a food sample is typically taken by means of a sampling instrument, the user is not exposed to the temperature in the food preparation vessel immediately, but at a certain distance from it. Maintaining a temperature in the range specified above for the modified continuation of the food preparation process therefore enables sufficient user safety and comfort, while counteracting deterioration of the cooking result. This configuration relates to the case when the desired temperature according to the cooking mode for the food preparation process is greater than 80° C., i.e., before modifying the cooking parameter from a value according to the cooking mode to a value according to the sampling mode.

In an alternative or supplementary configuration, a cooking parameter of the at least one cooking parameter that is modified in the sampling mode compared to the cooking mode for the modified continuation of the food preparation process is a desired pressure (in the food preparation vessel). The user can thus achieve an improved reproducibility of the cooking result in a particularly safe and convenient manner. In one embodiment, the desired pressure is less than 1.2 bar or 1.5 bar at the time of activation of the sampling mode. This embodiment relates to a food preparation process with a pressure in the food preparation vessel greater than 1.2 bar or 1.5 bar, respectively. In one embodiment, a pressure release valve is opened based on the desired pressure as cooking parameter according to the sampling mode, in particular for a period defined by this cooking parameter.

In one configuration, the food processor comprises detection means for detecting a lifting, an attempted lifting, or a closing of a lid. Thus, this configuration relates to detecting a lifting of the lid from the food preparation vessel, detecting of an attempt to lift off the lid from the food preparation vessel by a user, or detecting the closing of the food preparation vessel by the lid. The user can thus achieve an improved reproducibility of the cooking result in a particularly safe and convenient manner. The activation and termination of the sampling mode can be carried out very reliably.

In one configuration, the detection means comprises a contact sensor, a weight sensor, or a lid locking sensor. In one embodiment, the contact sensor is disposed in the lid or in the top edge region of the food preparation vessel and/or detects the presence or absence of the lid on the food preparation vessel. In one embodiment, the contact sensor detects the exceeding of a predetermined maximum distance between the lid and the food preparation vessel, in particular with respect to an upper side of the food preparation vessel with the opening for filling in food. Preferably, the contact sensor is a microswitch in order to keep the manufacturing effort low and at the same time to be able to monitor a maximum distance particularly easily. Alternatively or complementarily, the contact sensor can be designed as a proximity sensor. If the detection means comprises a weight sensor, recourse can be made to at least one already existing weight sensor, which is arranged in particular in the foot or at the up to three feet of the food processor. A lifting of the lid can preferably be automatically detected by detecting a weight loss by the amount of the weight of the lid, in particular plus an error tolerance and/or over a defined period of time. Closing of the lid can preferably be detected by increasing the weight by the amount of the weight of the lid, in particular plus an error tolerance and/or over a defined period of time.

In one embodiment, a detection means comprising a lid locking sensor can monitor a motor current of a motor for automatically locking the lid on the food preparation vessel. Preferably, the motor current can be used to determine whether the lid is properly placed on the food preparation vessel during closing. In one embodiment, an induced motor current can be used to determine that a user is lifting or attempting to lift the lid. Such a motor current is induced in the motor coil by the manual movement of the lid, and thus of a lid lock, by the user. In particular, a lid lock is realized in the form of at least one roller, preferably two rollers, which can be moved or rotated by motor force over an outer edge of the lid to securely fix the lid to the food preparation vessel.

An attempted lifting of the lid occurs when a specified maximum distance between the lid and the food preparation vessel is exceeded.

In one configuration, the food processor is configured such that the sampling mode is activated when the detection means detects a lift-off or attempted lift-off of the lid. In one configuration, the food processor is configured such that the control device changes from the sampling mode back to the cooking mode when the detection means detects a closing of the lid. The user can thus achieve an improved reproducibility of the cooking result in a particularly safe and convenient manner.

When the control device changes back from the sampling mode to the cooking mode, the food preparation process is basically continued as before the change to the sampling mode. The cooking parameters that were modified to values according to the sampling mode during the sampling mode are then reset to the values according to the cooking mode.

In one configuration, the food processor is configured such that the sampling mode is activated when a graphic symbol on a touchscreen display or a button is operated. The user can thus achieve an improved reproducibility of the cooking result in a particularly safe and convenient manner. Button means a mechanical button, which is preferably arranged on the housing of the food processor and can be operated by the user by hand. In particular, a recipe-independent activation of the sampling mode is possible. In one embodiment, one or two touch sensors may be provided in the lid or in the rollers of a locking device, each of which leads to activation of the sampling mode when touched by the user.

In an alternative or supplementary configuration, the food processor is configured such that the sampling mode is activated when an activation signal is received from a separate device, in particular from a smartphone, tablet PC, another kitchen appliance or another (preferably identical) food processor. In particular, the food processor comprises a receiving unit for receiving the activation signal. Preferably, this is a wireless receiving, in particular a Wi-Fi or Bluetooth connection. In one embodiment, the food processor by which the current cooking process is performed comprises a control that only implements commands received from the separate device by means of the functional components.

In one configuration, the food processor is configured such that the sampling mode is activated when a recipe step of a digital recipe causes the activation of the sampling mode. The user can thus achieve an improved reproducibility of the cooking result in a particularly safe and convenient manner. In one embodiment, the control device can access a digital recipe and be caused by a recipe step of the recipe to operate one of the functional components in a manner defined by the recipe step. Preferably, a digital recipe comprises a plurality of recipe steps. Some of these recipe steps include a food preparation process by heating, chopping, and/or mixing a food. In particular, the values of one or more cooking parameters may be defined by a recipe step for the food preparation process of that recipe step. Preferably, the recipe step may define for a cooking parameter a value according to the cooking mode and a value according to the sampling mode.

In one embodiment, the food processor is configured such that the sampling mode is deactivated when a graphic symbol on a touchscreen display or a button is operated a second time, another graphic symbol or another button is operated, a button is operated in a manner different from activation, or a recipe step of a digital recipe causes deactivation of sampling mode. When the sampling mode is deactivated, the control device changes from the sampling mode back to the cooking mode. The cooking parameters that were modified to values according to the sampling mode during the sampling mode are set to the values according to the cooking mode.

In one configuration, the control device comprises an enabling unit that is configured such that the activation of the sampling mode only leads to a change from the cooking mode to the sampling mode if the enabling unit enables this change. The user can thus achieve an improved reproducibility of the cooking result in a particularly safe and convenient manner.

In one configuration, the enabling unit enables the change only if a temperature, a torque, a rotation number, a pressure and/or a recipe step of a digital recipe meets a specified enabling criterion. The user can thus achieve an improved reproducibility of the cooking result in a particularly safe and convenient manner. In this configuration, the temperature, the torque, the rotation number and the pressure each refer in particular to a desired value or current measured value from the food preparation vessel. A recipe step can include an enabling parameter that indicates whether or not it is allowed to change to sampling mode, in particular time-resolved over the duration of the recipe step. The enabling criterion is then that it is permissible to change to sampling mode according to the enabling parameter.

In one embodiment, the control unit is configured such that it is only possible to change from sampling mode back to cooking mode if the enabling unit enables this change. In particular, the enabling criterion for enabling the change from the sampling mode back to the cooking mode is that the food preparation vessel is closed and/or locked by the lid. In one embodiment, a signal or information from the detection means that detects the closing of the lid is used to verify this enabling criterion. In an alternative or supplementary embodiment, a signal or information from the locking device or the lid locking sensor that indicates whether the lid is locked to the food preparation vessel is used for verifying the enabling criterion.

In one embodiment, a sampling instrument detection unit is provided that detects the absence of a sampling instrument. In this way, misuse can be counteracted.

In one embodiment, which may also be an independent aspect of the disclosure, a sampling instrument, in particular an elongated sampling instrument, is provided. The sampling instrument has, in an upper region, a handle portion for holding by a user and, in a lower region, a receiving portion for receiving a food sample. Thus, the receiving portion can receive a food sample. The upper region and the lower region are located on opposite sides from a center of the sampling instrument, particularly as viewed in the direction of the longitudinal extension of the sampling instrument. To take a food sample, the sampling instrument is moved into the food preparation vessel with the receiving portion first, immersed in the food so that the receiving portion fills with a food sample, and removed from the food preparation vessel (upward). In particular, the sampling instrument is shaped such that in the event of a collision of the sampling instrument with the rotating tool, the sampling instrument is moved or pushed upward by the tool. Upwards means in the direction of the rotation axis of the tool away from the tool. This prevents the sampling instrument from being dragged, rotated or jammed. The user can thus achieve an improved reproducibility of the cooking result in a particularly safe and convenient manner.

In one embodiment, the sampling instrument is shaped like a ladle. In particular, the sampling instrument, preferably the lower region, especially preferably the receiving portion, is shaped in a v shape. In particular, the receiving portion has an inclined outer wall that includes an angle of at least 30°, and/or at most 60° to a longitudinal extension direction of the sampling instrument. If the outer wall is curved, a centerline through the curved outer wall may be used to measure the angle. The receiving portion may have rectilinear and/or curved portions. In particular, the bottom of the receiving portion is curved.

In one embodiment, the sampling instrument comprises a communication interface for wireless transmission of status information to a control device of a food processor and/or at least one sensor for detecting status information of a food (in the food preparation vessel) or a food sample (in the receiving portion). The status of the food during the taking of the food sample can be evaluated in this way by the control device. The user can thus achieve an improved reproducibility of the cooking result in a particularly safe and convenient manner.

A further aspect of the disclosure relates to a method for taking a food sample from a food preparation vessel of a food processor, comprising the following steps: Heating, chopping and/or mixing a food in the food preparation vessel based on one or more cooking parameters according to a cooking mode of a control device of the food processor, activating a sampling mode of the control device, modifying at least one of the cooking parameters compared to the cooking mode by the control device for a modified continuation of the food preparation process, continuing the food preparation process based on the cooking parameters, at least one cooking parameter of which has been modified according to the sampling mode, taking the food sample by a sampling instrument from the food in the food preparation vessel. It is thus made possible for a user to achieve an improved reproducibility of the cooking result in an as usual safe and convenient manner. In particular, the lid is lifted off the food preparation vessel before the food sample is taken. The features, definitions and embodiments of the aspect of the disclosure described at the beginning also apply to this method.

In one configuration, the method comprises the additional step of: comparing a status information from the taking of the food sample or from the taken food sample with at least one target criterion. A status information from taking the food sample may for example be the temperature of the food from which the food sample has been taken. A status information from the taken food sample may be, for example, a salt concentration. Preferably, the at least one target criterion is stored in the control device so that a comparison of the status information with the target criterion can be used to detect a deviation from the desired status of the food. In one embodiment, the status information from the taking of the food sample can be measured by a sensor of the sampling instrument. In one alternative or complementary embodiment, the status information from the taken food may be measured by a sensor of the sampling instrument. Via a communication interface, the status information can be transmitted from the sampling instrument to the control device of the food processor, which can cause, for example, measures for optimizing the food preparation process based on the status information by comparing it with the target criterion. In particular, a cooking parameter is adjusted for optimization. For example, the desired cooking temperature is changed according to the cooking mode. It is also possible that the user is prompted to take an action, e.g. to add a spice.

In one configuration, the sampling instrument comprises a v-shaped receiving portion for receiving a food sample, the outer wall of which encloses an angle α between 30° and 60° to a longitudinal extension direction of the sampling instrument. This enables a user to achieve an improved reproducibility of the cooking result in an as usual safe and convenient manner.

The invention claimed is:

1. A food processor system, the system comprising
a food preparation vessel defining an interior space with an upwardly-facing opening,
a rotatable tool mounted in the interior space to interact with ingredients in the interior space and configured to be driven by a drive located outside the interior space,
a lid configured to be coupled to the food preparation vessel and to move relative to the food preparation vessel from a closed state blocking access at least partly to the interior space from the upwardly-facing opening to an opened state allowing access to the interior space through the upwardly-facing opening,
a lock device reconfigurable from a locked state in which the lid is retained in the closed state to an unlocked state in which the lid is released to allow a movement to the opened state,
a user interface configured such that a user can receive information and instructions from a control device and provide input to the control device, and
wherein the control device is in communication with the user interface, the drive, and the lock device, wherein the control device is configured to operate the rotatable tool and the lock device in one of a cooking mode for modification of ingredients in the interior space and a sampling mode for safe removal of a sample from the interior space,
wherein activation of the sampling mode from the cooking mode is initiated by at least one of a digital recipe step, receipt of a user input from an enabling unit, and receipt of a signal associated with movement of the lid from the closed state toward the opened state,
wherein the control device is configured to direct reconfiguration of the lock device from the locked state to the unlocked state in response to activation of the sampling mode by an instruction of a recipe step of a digital recipe such that the user safely removes a sample from the interior space of the food preparation vessel with a sampling instrument and a status information from the taken food sample is compared with at least one target criterion stored in the control device, and
wherein the control device is configured to detect a deviation from the desired status of the food based on said comparison of the status information with the target criterion.

2. The system of claim 1, wherein an automatic return to the cooking mode from the sampling mode is initiated if movement of the lid to the closed state is detected indicating a user has obtained the sample, and wherein the control device is configured to direct reconfiguration of the lock device from the unlocked state to the locked state upon automatic return to the cooking mode.

3. The system of claim 2, wherein an automatic return to the cooking mode from the sampling mode is initiated if the lid has not been moved from the closed state to the opened state after a predetermined period of time following activation of the sampling mode, and wherein the control device is configured to direct reconfiguration of the lock device from the unlocked state to the locked state upon automatic return to the cooking mode.

4. The system of claim 1, wherein the controller is configured to direct the drive of the rotatable tool to reduce torque applied to the rotatable tool in response to initiation of the sampling mode.

5. The system of claim 4, further comprising a heating element configured to heat ingredients in the interior space, wherein the controller is in communication with the heating element, and wherein the controller is configured to direct the heating element to reduce heat in response to initiation of the sampling mode and to delay reconfiguration of the lock device from the locked state to the unlocked state until actual temperature in the food preparation vessel falls below a predetermined threshold.

6. The food processor of claim 1, wherein the food processor system comprises an automatic lifting device that is configured to lift the lid off the food preparation vessel for taking the food sample.

7. A food processor configured to perform a food preparation process by heating with a heating element, chopping, and/or mixing a food in a food preparation vessel with a rotatable tool having at least one blade, wherein the food processor comprises
a lid configured to be coupled to the food preparation vessel,
a control device configured such that the control device ensures, based on one or more cooking parameters, that in a cooking mode a food is heated, chopped and/or mixed in the food preparation vessel,
wherein a sampling mode is provided for taking a food sample by the user with a sampling instrument to obtain a status information from the taken food sample, and the control device is configured such that at least one of the cooking parameters is modified compared to the cooking mode for a modified continuation of the food preparation process when the sampling mode is activated, and
wherein the control unit is configured such that, in response to lifting off of the lid not having been detected after a defined period of time following activation of the sampling mode, the control unit conducts an automatic change back to the cooking mode, wherein cooking parameters that were modified to values according to the sampling mode during the sampling mode are then reset to the values according to the cooking mode.

8. The food processor of claim 7, wherein a cooking parameter of the at least one cooking parameter modified in the sampling mode compared to the cooking mode for the modified continuation of the food preparation process is a desired torque of the rotatable tool in the food preparation vessel.

9. The food processor of claim 8, wherein the desired torque of the rotatable tool in the sampling mode is at most 0.4 N*m.

10. The food processor of claim 8, wherein the desired rotation number in the sampling mode is at most 220 rpm.

11. The food processor of claim 8, wherein the desired temperature in the sampling mode is at most 80° C.

12. The food processor of claim 7, wherein the food processor comprises detection means for detecting a lifting, an attempted lifting, or a closing of a lid.

13. The food processor of claim 12, wherein the detection means comprises a contact sensor, a weight sensor or a lid locking sensor.

14. The food processor of claim 12, wherein the food processor is configured such that the sampling mode is activated when the detection means detects a lifting or an attempted lifting of the lid, and/or the control device changes from the sampling mode back to the cooking mode when the detection means detects a closing of the lid.

15. The food processor of claim 7, wherein the food processor is configured such that the sampling mode is activated in response to at least one of a graphic symbol on a touch screen display being operated, a button being operated, and an activation signal being received from a separate device.

16. The food processor of claim 7, wherein the food processor is configured such that the sampling mode is activated when a recipe step of a digital recipe causes activation of the sampling mode.

17. The food processor of claim 7, wherein the control device comprises an enabling unit configured such that the activation of the sampling mode only results in a change from the cooking mode to the sampling mode if the enabling unit enables this change.

18. The food processor of claim 17, wherein the enabling unit enables the change only if a temperature, a torque, a rotation number, a pressure and/or a recipe step of a digital recipe meets a specified enabling criterion.

19. A method for taking a food sample from a food preparation vessel of a food processor comprising the following steps:
heating, chopping, and/or mixing a food in a food preparation vessel based on one or more cooking parameters according to a cooking mode of a control device of the food processor, the food preparation vessel defining an interior space with an upwardly-facing opening, wherein a rotatable tool is mounted in the interior space to interact with ingredients in the interior space and configured to be driven by a drive located outside the interior space,
coupling a lid to the food preparation vessel and moving the lid relative to the food preparation vessel from a closed state blocking access at least partly to the interior space from the upwardly-facing opening to an opened state allowing access to the interior space through the upwardly-facing opening,
providing a lock device reconfigurable from a locked state in which the lid is retained in the closed state to an unlocked state in which the lid is released to allow a movement to the opened state,
providing a user interface configured such that a user can receive information and instructions from a control device and provide input to the control device, wherein the control device is in communication with the user interface, the drive, and the lock device, wherein the control device is configured to operate the rotatable tool and the lock device in one of the cooking mode for modification of ingredients in the interior space and a sampling mode for safe removal of a sample from the interior space,
activating the sampling mode of the control device by at least one of a digital recipe step, receipt of a user input from an enabling unit, and receipt of a signal associated with movement of the lid from the closed state toward the opened state, directing reconfiguration of the lock device from the locked state to the unlocked state via the control device in response to activation of the sampling mode by an instruction of a recipe step of a digital recipe so as to enable the user to safely remove a sample from the interior space of the food preparation vessel with a sampling instrument, modifying at least one of the cooking parameters compared to the cooking mode by the control device for a modified continuation of the food preparation process, continuing the food preparation process based on the cooking parameters, at least one cooking parameter of which has been modified according to the sampling mode, taking the food sample by a sampling instrument from the food in the food preparation vessel, comparing a status information from the taken food sample with at least one target criterion stored in the control device, and detect, via the control device, a deviation from the desired status of the food based on said comparison of the status information with the target criterion.

* * * * *